United States Patent
Kim et al.

(10) Patent No.: US 9,391,481 B2
(45) Date of Patent: Jul. 12, 2016

(54) SPHERICAL WHEEL MOTOR

(71) Applicant: Electronics and Telecommunications Research Institute, Daejeon (KR)

(72) Inventors: Minki Kim, Gyeongsangbuk-do (KR); Yil Suk Yang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 462 days.

(21) Appl. No.: 13/673,107

(22) Filed: Nov. 9, 2012

(65) Prior Publication Data

US 2013/0113307 A1 May 9, 2013

(30) Foreign Application Priority Data

Nov. 9, 2011 (KR) .......................... 10-2011-0116256

(51) Int. Cl.
*H02K 5/04* (2006.01)
*H02K 41/03* (2006.01)

(52) U.S. Cl.
CPC ................ *H02K 5/04* (2013.01); *H02K 41/031* (2013.01); *H02K 2201/18* (2013.01)

(58) Field of Classification Search
CPC . H02K 57/00; H02K 57/006; H02K 2201/18; H02K 1/06; H02K 1/185; H02K 1/2706; H02K 5/04; H02K 41/031; H02K 41/06; B60B 19/003; B60B 19/12; B60B 19/14
USPC ..................... 310/156.38, 254.1, 264.1, 26.11
See application file for complete search history.

(56) References Cited

U.S. PATENT DOCUMENTS

| | | | | |
|---|---|---|---|---|
| 5,413,010 | A | * | 5/1995 | Nakanishi et al. ............. 74/5.22 |
| 5,476,018 | A | * | 12/1995 | Nakanishi et al. ............... 74/5.7 |
| 2009/0021094 | A1 | | 1/2009 | Takimoto et al. |
| 2009/0230787 | A1 | * | 9/2009 | Won et al. ........................ 310/38 |
| 2012/0152628 | A1 | * | 6/2012 | Patti et al. ........................ 180/21 |
| 2013/0151043 | A1 | * | 6/2013 | Jung .............................. 701/22 |

FOREIGN PATENT DOCUMENTS

| | | |
|---|---|---|
| EP | 1023762 B1 | 12/2002 |
| JP | 2006033978 A * | 2/2006 |
| JP | 2007060891 A * | 3/2007 |
| JP | 2008086131 A * | 4/2008 |
| JP | 2009296864 A * | 12/2009 |

(Continued)

OTHER PUBLICATIONS

Sadakata et al., JP2008086131 Machine Translation, Apr. 2008.*
Yano, Design of a Hexahedron-Octahedron Based Spherical Stepping Motor, 2008 (no month available), International Symposium on Micro-Nanomechatronics and Human Science, pp. 519-524.*

(Continued)

*Primary Examiner* — Quyen Leung
*Assistant Examiner* — Eric Johnson
(74) *Attorney, Agent, or Firm* — Rabin & Berdo, P.C.

(57) ABSTRACT

Disclosed is a spherical wheel motor including: a spherical rotor having freedom of rotation along surrounding magnetized directions; a stator formed in a dome shape enclosing the rotor and configured to form magnetization at various angles through a plurality of coils distributed therein, and impart the freedom of rotation to the rotor; and a driving unit configured to identify a position of the rotor, supply current to each coil of the stator according to the position of the rotor, and drive the rotor.

7 Claims, 4 Drawing Sheets

(56) References Cited

FOREIGN PATENT DOCUMENTS

| | | | |
|---|---|---|---|
| KR | 2003-0037449 A | 5/2003 | |
| KR | 2009-0093523 A | 9/2009 | |
| WO | 99/19971 A | 4/1999 | |

OTHER PUBLICATIONS

Kok-Meng Lee et al., "Concept Development and Design of a Spherical Wheel Motor (SWM)," Proceedings of the 2005 IEEE International Conference on Robotics and Automation, Apr. 2005, pp. 3652-3657.

* cited by examiner

SPHERICAL WHEEL MOTOR

CROSS-REFERENCE TO RELATED APPLICATIONS

This application is based on and claims priority from Korean Patent Application No. 10-2011-0116256, filed on Nov. 9, 2011, with the Korean Intellectual Property Office, the disclosure of which is incorporated herein in its entirety by reference.

TECHNICAL FIELD

The present disclosure relates to a spherical wheel motor, and more particularly, to a spherical wheel motor including a bipolar spherical rotor and a stator having a radial coil structure.

BACKGROUND

As a device that relays electrical energy in the form of mechanical energy, a motor is used in many different forms in various machines, electric products, and electronic products. Because existing motors rotate about one axis and are restricted by that axis to rotating in only two directions, the motors are restricted in movement. Therefore, due to limits in how motors of the related art may be controlled in terms of rotating direction, applications of the motors were limited.

In order to solve this problem and realize greater freedom of movement for a motor, although a method of connecting multiple motors with one joint has been proposed, there is the drawback of requiring many links and a complicated converting device. To compensate for this drawback, a spherical motor having a 3-directional degree of freedom has been introduced, which is exemplified by the spherical motor disclosed in Korean registered patent 0954772 (registration date: Apr. 29, 2010). The spherical wheel motor having a freedom of rotational direction as disclosed in the above patent may be used for steering movement in automobiles and motorboats, for eye movement and arm, neck, and hip joint movement in robots.

Spherical wheel motors that can replace the wheels of transportation means such as automobiles needs to be capable of rotational movement without an axis, and require accurate positional control of the rotor and a simple structure. However, the rotors of related art spherical wheel motors are formed on the basis of a shaft, are structurally complicated due to the use of a plurality of permanent magnets, and are also limited in terms of freedom of rotation.

SUMMARY

The present disclosure has been made in an effort to provide a spherical wheel motor that is not limited in terms of rotating direction and has a comparatively simple shape.

The present disclosure has been made in an effort to also provide a spherical wheel motor in which the stator more easily controls the rotor, so as to facilitate the driving thereof.

An exemplary embodiment of the present disclosure provides a spherical wheel motor including: a spherical rotor having freedom of rotation along surrounding magnetized directions; a stator formed in a dome shape enclosing the rotor and configured to form magnetization at various angles through a plurality of coils distributed therein, and impart the freedom of rotation to the rotor; and a driving unit configured to identify a position of the rotor, supply current to each coil of the stator according to the position of the rotor, and drive the rotor.

According to the exemplary embodiment of the present disclosure, a spherical wheel motor is provided which is not limited in terms of the rotational direction thereof, so that the motor may be used for a wheel of transportation means such as an automobile, and may be applied as a propelling means for a motorboat and for the movement of a camera lens.

The foregoing summary is illustrative only and is not intended to be in any way limiting. In addition to the illustrative aspects, embodiments, and features described above, further aspects, embodiments, and features will become apparent by reference to the drawings and the following detailed description

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Figure 1:
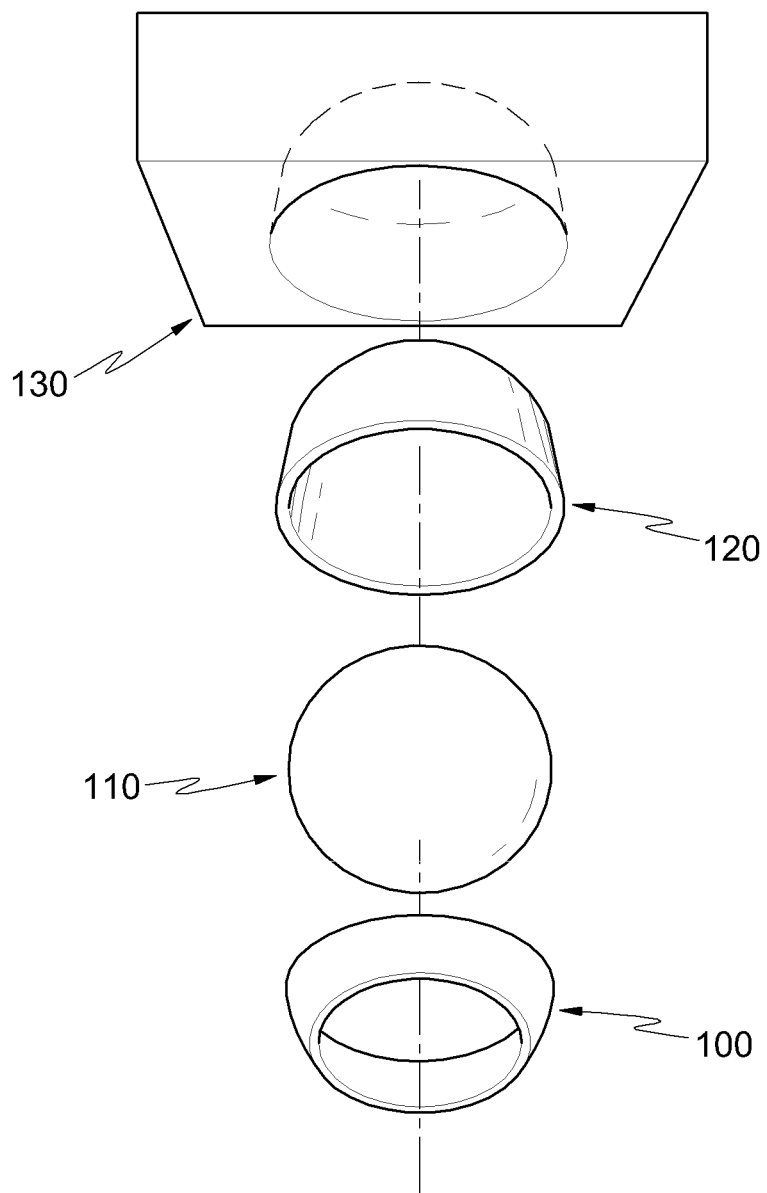
FIG. 1 is a view illustrating the structure of a spherical wheel motor according to an exemplary embodiment of the present disclosure.

FIG. 1 is a view illustrating the structure of a spherical wheel motor according to an exemplary embodiment of the present disclosure.

Referring to FIG. 1, a spherical wheel motor according to the present disclosure includes a rotor cover 100, a rotor 110, a stator 120, and a driving unit 130. The spherical wheel motor may further include a gap or a bearing between the stator 120 and the rotor 110 so as to reduce friction.

The rotor 110 is formed in the shape of a sphere, and forms a magnetic field which is the starting point for the movement of the motor. To this end, the rotor 110 includes a permanent magnet, and the permanent magnet may be formed as a surface magnet or a buried magnet. The detailed structure of the rotor 110 according to the present disclosure will be described with reference to FIG. 2.

The stator 120 is formed in the shape of a dome to enclose the rotor 110, and has a plurality of coils arranged radially about a central coil on the inner surface thereof to enclose the rotor 110. Here, each coil forms a magnetic field that has a polarity opposite to that of a symmetrical coil with respect to the center of the rotor 110. The detailed structure of the stator 120 according to the present disclosure will be described with reference to FIG. 3A and FIG. 3B.

The driving unit 130 identifies the position of the rotor 110, and drives the rotor 110 by supplying a current to each coil of the stator 120 according to the position of the rotor 110. To this end, the driving unit 130 has a power device and a driving circuit mounted therein to drive the motor, and a detailed description thereof will be provided below with reference to FIG. 4.

Figure 2:
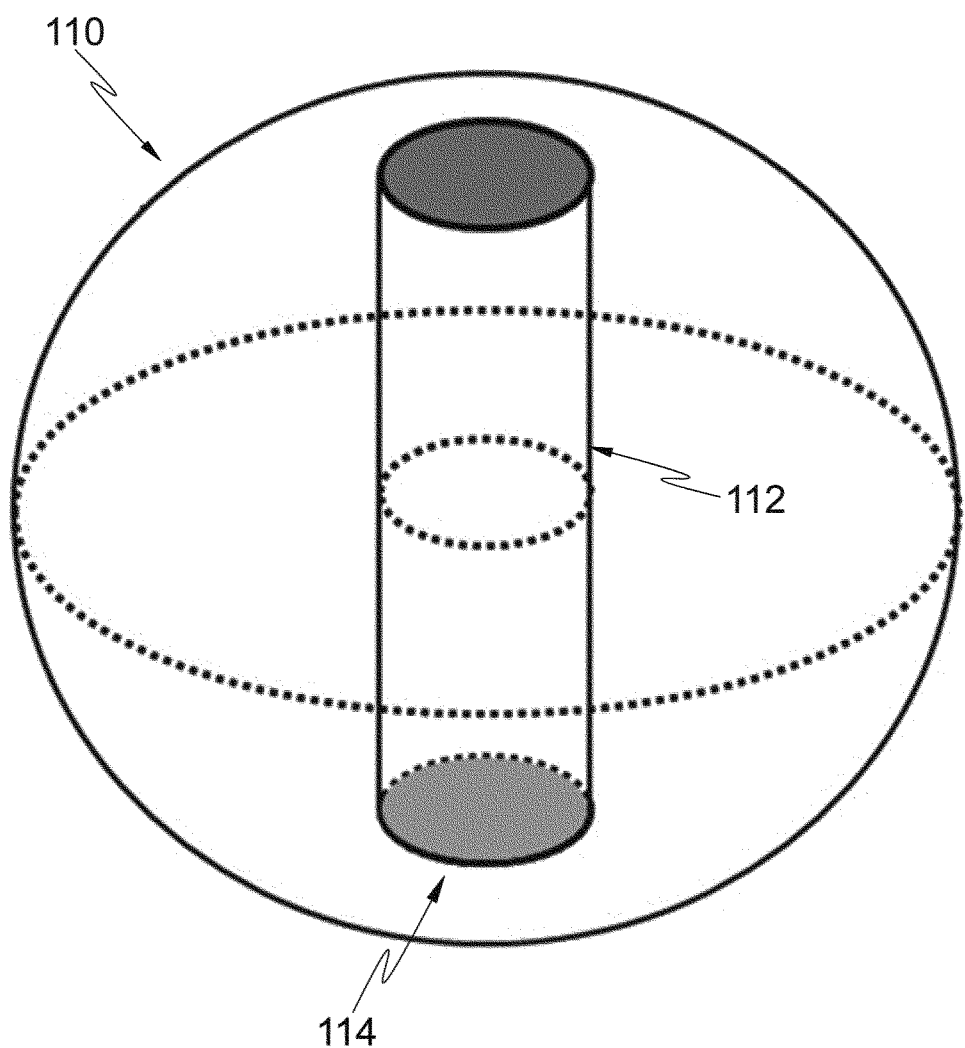
FIG. 2 is a view illustrating the structure of a rotor according to an exemplary embodiment of the present disclosure.

FIG. 2 is a view illustrating the structure of a rotor according to an exemplary embodiment of the present disclosure.

Referring to FIG. 2, the rotor 110 according to the present disclosure includes a permanent magnet 112 having one each of an N pole and an S pole. The permanent magnet 112, as illustrated in the drawing, is inserted in the rotor 110 as a buried permanent magnet. Accordingly, the rotor 110 is rotated and directly actuated by receiving the force of a magnetic field formed by the coils of the stator 120 during the operation of the motor, and because the rotor 110 has a spherical shape, the rotating direction thereof may easily be changed.

Figure 3A:
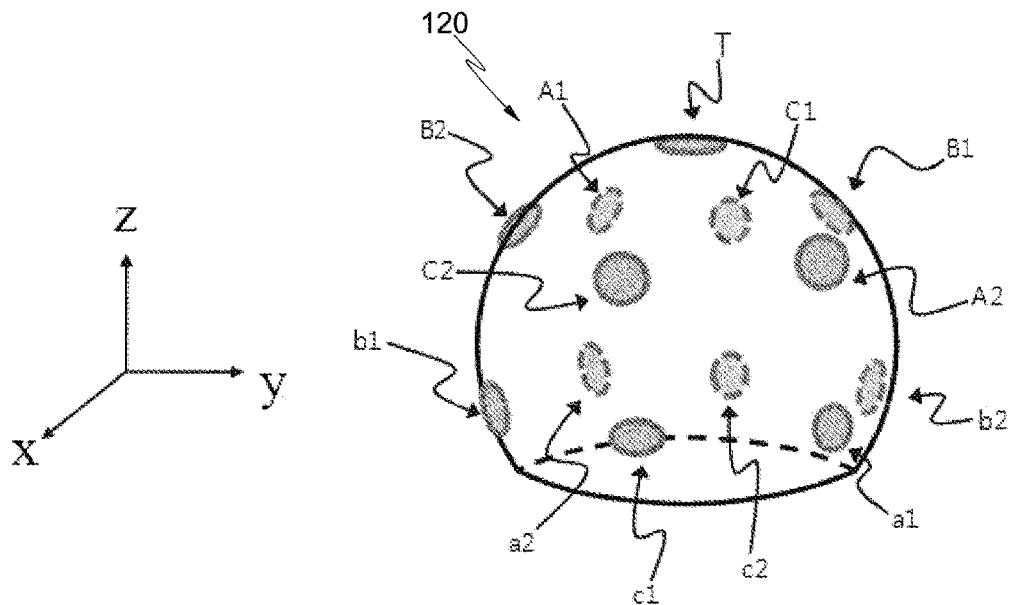
FIG. 3A and FIG. 3B is a view illustrating the structure of a stator according to an exemplary embodiment of the present disclosure.
Figure 3B:
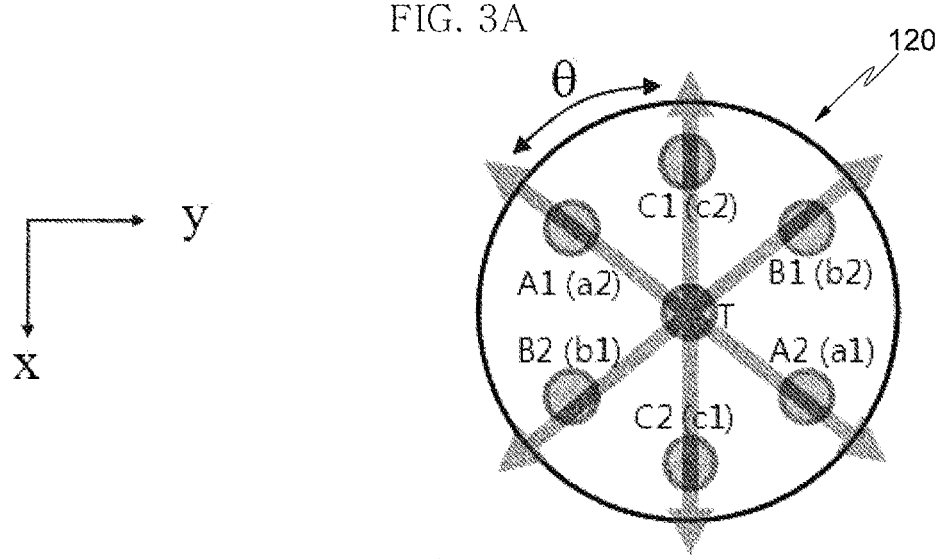

FIG. 3A and FIG. 3B is a view illustrating the structure of a stator according to another exemplary embodiment of the present disclosure. In particular, FIG. 3A is a side view illustrating the structure of the stator according to an exemplary embodiment of the present disclosure, and FIG. 3B is a plan view illustrating the structure of the stator according to an exemplary embodiment of the present disclosure.

The stator 120 according to the present disclosure includes a plurality of coils disposed radially with respect to a central coil disposed at the center of the top portion thereof. Accordingly, the precision in directional control of the stator 120 is determined by the number of coils formed diverging from the center of the top portion ($\theta=360°/2n$, where $\theta$ is the angle between radial directions, and n is the number of radial directions), and the greater the number of radial directions, the angles may be more precisely controlled. However, as the number of radial directions increases, the number of coils ($x=4n+1$, where x is the number of coils, and n is the number of radial directions) increases, and the greater the number of coils, the number of power devices of the driving unit 130 also increases.

As illustrated in FIG. 3A and FIG. 3B, a plurality of first coils (A1, A2, B1, B2, C1, and C2) is disposed in three directions passing a central coil T disposed at the center of the top portion of the stator 120, and when a circle is drawn centered around the top portion of the stator 120, radial directions are set at 60 degree intervals ($\theta=360°/2n$, where n is 3). A plurality of second coils (a1, a2, b1, b2, c1, and c2) is disposed at 60 degree intervals from the aforementioned radial directions, respectively. By virtue of the dome structure of the stator 120, the lowermost portion of the rotor 110 is excluded from coils. Therefore, the total number of coils ($x=4n+1$, where n is the number of radial directions) disposed in the stator 120 according to the present disclosure is 13.

With the exception of the central coil T, each of the coils is symmetrically formed with respect to the center of the spherical rotor 110. Specifically, coil A1 and coil a1 are formed symmetrically to each other, and coil A2 and coil a2 are formed symmetrically to each other. Coil B1 and coil b1 are formed symmetrically to each other, and coil B2 and coil b2 are formed symmetrically to each other. Coil C1 and coil c1 are formed symmetrically to each other, and coil C2 and coil c2 are formed symmetrically to each other.

In order to drive the aforementioned plurality of coils (T, A1, A2, B1, B2, C1, C2, a1, a2, b1, b2, c1, and c2), seven phases are required, where two coils per phase are serially connected, and each phase converges at an N node—that is, at the central coil T. Accordingly, when the motor is driven and current flows through the coils, while current that flows through two coils located in one phase is the same, because the two coils are symmetrical centered about the rotor 110, the directions of current at positions in contact with the inner surface of the rotor 110 are different, and the two coils form opposed magnetic fields respectively centered about a circle, so that the stator 120 controls both poles of the rotor 110. By virtue of this structure, the stator 120 according to the present disclosure may simultaneously control both poles of the rotor 110 when current is applied to the coils.

The spherical wheel motor according to the present disclosure may further include a position sensing unit for sensing the position of the rotor 110. As an embodiment of a position sensing unit, a Hall sensor (not illustrated) may be installed in the stator 120 to sense magnetic force. If a Hall sensor (not illustrated) as a position sensing unit is to be applied, one Hall sensor is attached for each phase. Therefore, the Hall sensor (not illustrated) senses the magnetic force generated from the permanent magnet 112 of the rotor 110 and generates a signal corresponding to an N pole and an S pole.

Figure 4:
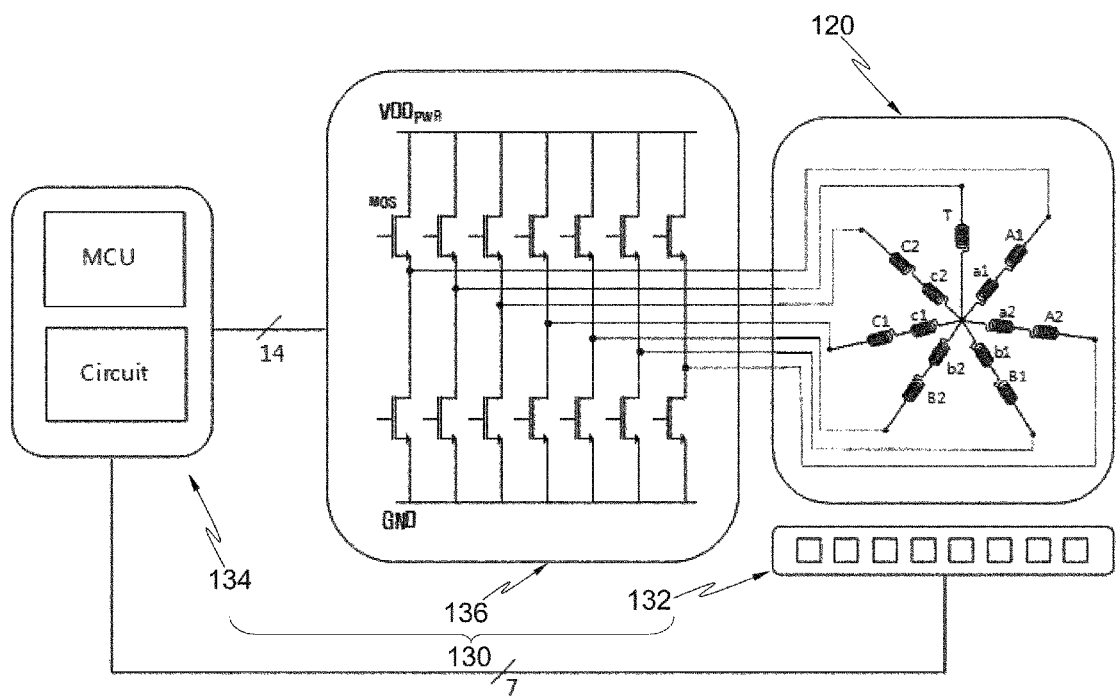
FIG. 4 is a circuit diagram of a spherical wheel motor according to an exemplary embodiment of the present disclosure.

FIG. 4 is a circuit diagram of a spherical wheel motor according to an exemplary embodiment of the present disclosure.

Referring to FIG. 4, the driving unit 130 according to the present disclosure includes a position sensing unit 132, a motor control unit 134, and a power device driving unit 136.

As a preprocessing unit for a driving signal, the position sensing unit 132 identifies the position of the rotor 110 and outputs a position signal. Here, the position sensing unit 132 receives a signal according to a magnetic field of the rotor 110 from a Hall sensor attached within the stator 120 to identify the position of the rotor 110, or senses an output current signal and a voltage signal for each phase and calculates a counter-electromotive force so as to identify the position of the rotor 110. The position sensing unit 132 in an exemplary embodiment of the present disclosure uses a Hall sensor to identify the position of the rotor 110.

The motor control unit 134 is a component that performs the important function of driving the motor by outputting a driving signal according to the position signal received from the position sensing unit 132, and may include a micro controller unit (MCU), a field-programmable gate array (FPGA), and an A/D mixed circuit module. That is, the motor control unit 134 receives a position signal for the rotor 110 from the position sensing unit 132, and outputs a driving signal to the power device driving unit 136. The driving algorithm of the motor control unit 134 may use a trapezoidal, sinusoidal, and vector method employed in an existing brushless DC (BLDC)/brushless AC (BLAC) motor.

The power device driving unit 136 performs a switching function for supplying current to each coil disposed in the stator 120 according to the driving signal received from the motor control unit 134. Connected as a bundle including a power device and a coil, the power device driving unit 136 thus supplies current to a coil to generate magnetic force by means of the coil and drive the rotor 110.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:
1. A spherical wheel motor comprising:
   a spherical rotor having freedom of rotation along surrounding magnetized directions;
   a stator formed in a dome shape enclosing the rotor and configured to form magnetization at various angles through a plurality of coils distributed therein, and impart the freedom of rotation to the rotor; and a driving unit configured to identify a position of the rotor, supply current to each coil of the stator according to the position of the rotor, and drive the rotor, wherein:

the plurality of coils include a central coil disposed at the center of a top portion of the stator and a multiple sets of coils diverging from the central coil;

when taken from a top plan view of the stator, the multiple sets of coils are disposed to form a plurality of radial directions diverging from the central coil, each set of coils being disposed in the same radial direction, two adjacent ones of the plurality of radial directions forming a same angle of interval;

the rotor includes a single permanent magnet having an N pole and an S pole, the single permanent magnet being buried in the rotor, the single permanent magnet extending from one end thereof to another end thereof without discontinuity, the single permanent magnet passing a center of the spherical rotor; and two opposite ones of the coils in the multiple sets are symmetrical with respect to a center of the spherical rotor and have an opposite polarity with respect to each other.

2. The spherical wheel motor of claim 1, wherein the driving unit includes:

a position sensing unit configured to identify a position of the rotor and output a position signal;

a motor control unit configured to output a driving signal according to the position signal received from the position sensing unit; and a power device driving unit configured to supply current to each of the coils according to the driving signal received from the motor control unit.

3. The spherical wheel motor of claim 1, wherein each set of said multiple sets consists of multiple pairs of coils, each pair including two opposite coils disposed symmetrically with respect to the center of the spherical rotor.

4. The spherical wheel motor of claim 1, wherein three sets of coils are provided to form three radial directions diverging from the central coil.

5. The spherical wheel motor of claim 4, wherein each set of said three sets includes two pairs of coils, each pair including two opposite coils disposed symmetrically with respect to the center of the spherical rotor.

6. The spherical wheel motor of claim 1, wherein the plurality of coils include a plurality of first coils and a plurality of second coils, wherein the plurality of first coils are disposed between the central coil and the plurality of second coils, wherein the plurality of first coils and the plurality of second coils are disposed in radial directions passing the central coil disposed at the center of the top portion of the stator, wherein the radial directions are set at 60 degree interval.

7. The spherical wheel motor of claim 1, further comprising a rotor cover which has a shape of a zone of a spherical shell and covers a portion of the rotor uncovered by the stator, the rotor cover having an opening through which the rotor is exposed to an outside.

\* \* \* \* \*